United States Patent
Mosteller (10) Patent No.: US 10,949,820 B2
(45) Date of Patent: Mar. 16, 2021

(54) SYSTEM AND METHOD FOR ENCODING IC CHIPS FOR PAYMENT OBJECTS

(71) Applicant: CPI CARD GROUP—COLORADO, INC., Littleton, CO (US)

(72) Inventor: Barry Mosteller, Castle Pines, CO (US)

(73) Assignee: CPI CARD GROUP—COLORADO, INC., Littleton, CO (US)

( * ) Notice: Subject to any disclaimer, the term of this patent is extended or adjusted under 35 U.S.C. 154(b) by 0 days.

(21) Appl. No.: 16/598,921

(22) Filed: Oct. 10, 2019

(65) Prior Publication Data
US 2020/0134582 A1 Apr. 30, 2020

Related U.S. Application Data

(63) Continuation of application No. 15/780,176, filed as application No. PCT/US2017/019175 on Feb. 23, 2017, now Pat. No. 10,535,046.

(Continued)

(51) Int. Cl.
| | |
|---|---|
| H01L 21/50 | (2006.01) |
| G06Q 20/10 | (2012.01) |
| G06Q 20/34 | (2012.01) |
| B42D 25/485 | (2014.01) |
| G06K 19/077 | (2006.01) |
| H01L 21/683 | (2006.01) |

(52) U.S. Cl.
CPC ......... *G06Q 20/105* (2013.01); *B42D 25/485* (2014.10); *G06K 19/07718* (2013.01); *G06K 19/07749* (2013.01); *G06Q 20/341* (2013.01); *G06Q 20/355* (2013.01); *H01L 21/50* (2013.01); *H01L 21/6835* (2013.01)

(58) Field of Classification Search
CPC .. G06Q 20/105; G06Q 20/355; G06Q 20/341; B42D 25/485; G06K 19/07718; G06K 19/07749; H01L 21/50; H01L 21/6835
See application file for complete search history.

(56) References Cited

U.S. PATENT DOCUMENTS

| | | |
|---|---|---|
| 6,308,894 B1 | 10/2001 | Hirai et al. |
| 6,367,011 B1 | 4/2002 | Lee et al. |

(Continued)

FOREIGN PATENT DOCUMENTS

WO 2013086307 A1 6/2013

*Primary Examiner* — Matthew L Reames
(74) *Attorney, Agent, or Firm* — Dorsey & Whitney LLP (57) ABSTRACT

A system and method are disclosed for providing integrated circuit (IC) chip modules for inclusion in payment objects. IC chip modules may be received from a supplier of IC chip modules, wherein the IC chip modules are supportably interconnected to a flexible substrate and transport key data is encoded in the IC chip modules. Each IC chip module may be encoded with personalization data and issuer key data. Encoding of IC chip modules may be completed utilizing either a contact IC chip interface device or a non-contact IC chip interface device. Encoding the IC chip modules may be completed with the IC chip modules supportably interconnected to the flexible substrate as supplied by the supplier of the IC chip modules, free from fixed interconnection of the IC chip modules and carrier to another support structure.

17 Claims, 3 Drawing Sheets

Related U.S. Application Data

(60) Provisional application No. 62/299,147, filed on Feb. 24, 2016.

(56) References Cited

U.S. PATENT DOCUMENTS

| | | |
|---|---|---|
| 6,394,346 B1 * | 5/2002 | Bonneau, Jr. ............ G01N 3/20 235/380 |
| 6,402,028 B1 | 6/2002 | Graham, Jr. et al. |
| 6,588,673 B1 | 7/2003 | Chan et al. |
| 7,134,603 B2 | 11/2006 | Batoha |
| 7,818,085 B1 | 10/2010 | Chang |
| 2003/0061947 A1 * | 4/2003 | Hohberger ........... B65H 37/002 101/2 |
| 2004/0256469 A1 | 12/2004 | Faenza, Jr. et al. |
| 2007/0075132 A1 | 4/2007 | Kean |
| 2007/0108298 A1 | 5/2007 | Kalck et al. |
| 2009/0032193 A1 * | 2/2009 | Fukui ..................... B41J 3/50 156/350 |
| 2012/0016793 A1 | 1/2012 | Peters et al. |
| 2012/0047716 A1 | 3/2012 | Meeker et al. |
| 2012/0112367 A1 | 5/2012 | Tarantino |
| 2013/0274909 A1 * | 10/2013 | Pasquariello .... G05B 19/41875 700/110 |
| 2014/0104133 A1 * | 4/2014 | Finn ................... H01Q 1/2283 343/866 |
| 2016/0300128 A1 * | 10/2016 | Alvig .................... B41J 13/12 |

\* cited by examiner

SYSTEM AND METHOD FOR ENCODING IC CHIPS FOR PAYMENT OBJECTS

RELATED APPLICATIONS

This application is a continuation of U.S. patent application Ser. No. 15/780,176, having a 371(c) date of May 30, 2018, now U.S. Pat. No. 10,533,046, issued Jan. 14, 2020, entitled "SYSTEM AND METHOD FOR ENCODING IC CHIPS FOR PAYMENT OBJECTS", which is a U.S. National Stage of International Patent Application No. PCT/US2017/019175, entitled "SYSTEM AND METHOD FOR PROVIDING IC CHIP MODULES FOR PAYMENT OBJECTS", filed Feb. 23, 2017, which claims the benefit of priority to U.S. Provisional Patent Application No. 62/299,147 filed Feb. 24, 2016, entitled "SYSTEM AND METHOD FOR PROVIDING IC CHIP MODULES FOR PAYMENT OBJECTS," all of which foregoing Patent Applications are incorporated herein by reference in their entirety.

BACKGROUND

Integrated circuit (IC) chip cards are increasingly utilized as transaction cards for payment in conjunction with a given transaction (e.g. credit cards, debit cards and stored value cards). In that regard, card issuer payment institutions issue IC chip transaction cards to customers that each have a corresponding specific customer payment account administered by or on behalf of the card issuer. In conjunction with the provision of IC chip transaction cards, IC chips are typically provided to a card fabricator that incorporates the IC chips into IC chip cards. The IC chips may be incorporated in transaction cards for contact and/or non-contact interface with transaction card readers.

Recently, payment objects (i.e. objects other than transaction cards) have been proposed that include an IC chip encoded with data associated with a specific payment account administered by or on behalf of a payment institution, wherein the payment objects may be utilized to complete a given transaction. In conjunction with such products, IC chips are typically incorporated in to and thereby fixedly interconnected to card bodies (e.g. an ID-1 sized card as specified in ISO/IEC 7810 standards) for automated handling, including automated handling for encoding of personalization data (i.e. account-specific data) in to the IC chips. In turn, the card bodies may be provided (e.g. scored) to have a preconfigured breakout portion that includes a portion of the card body and a corresponding IC chip and interconnected antenna, and that may be separated from the rest of the corresponding card body after automated handling and prior to incorporation into a payment object. The utilization of card bodies and the separation of breakout portions entails both material and production costs, as well as manufacturing complexities.

SUMMARY

The present disclosure is directed to an improved system and method for providing IC chip modules for use in payment objects. As used herein, an IC chip module is intended to refer to an IC chip and interconnected antenna (i.e. electrically and physically interconnected for wireless interface between the IC chip and an IC chip reader) that are fixedly interconnected to a flexible carrier for co-movement therewith. Optionally, the IC chip module may include contact pads interconnected to the IC chip (i.e. electrically and physically interconnected for contact interface between the IC chip and an IC chip reader), and fixedly interconnected to the flexible carrier for co-movement therewith. In one approach, an antenna may be directly connected to a first side of a flexible carrier and an IC chip may be directly connected to the antenna on the first side of the flexible carrier. Optionally, contact pads may be directly connected to an opposite second side of the flexible carrier for co-movement therewith, with direct cross-connections provided through the flexible carrier from the contact pads to the IC chip. In another arrangement, an IC chip and directly connected antenna (e.g. a length of coiled wire) may be disposed within an outer casing (e.g. an epoxy or glass capsule), and the casing may be fixedly interconnected to one side of a flexible carrier for co-movement therewith.

In one embodiment, a method for providing integrated circuit (IC) chip modules for inclusion in payment objects (e.g. pursuant to a given corresponding order) may include receiving and powering an IC chip module. The embodiment may further include encoding the following data in different predetermined memory portions of the IC chip comprising the IC chip module after powering:

personalization data provided by an issuer payment institution corresponding with a specific payment account administered by the payment institution, including corresponding account identification data; and, issuer key data provided by the issuer payment institution.

In turn, the method embodiment may include terminating the powering after the encoding, wherein the IC chip module is automatically locked to restrict access to at least the issuer key data (e.g. to restrict read/write access other than by use of the issuer key data) and to restrict modification of the personalization data (e.g. to restrict write operations). Further, after the terminating, the method may include packaging the IC chip module (e.g. for subsequent provision to a corresponding third-party for inclusion in a payment object).

In contemplated embodiments, the IC chip module is one of a plurality of IC chip modules supportably interconnected to a flexible substrate (e.g. a ribbon-like flexible tape), wherein the flexible carrier of each of the plurality of IC chip modules is defined by a different corresponding portion of the flexible substrate, as supplied by a supplier of the plurality of IC chip modules. In turn, the receiving, powering, encoding and terminating steps may be completed free from fixed interconnection of the IC chip module and flexible substrate to another structure (e.g. a card body or other rigid or semi-rigid structural support element).

In some embodiments, the receiving step may include positioning the IC chip module at a first position, and the powering step may include utilizing one of a contact IC chip interface device and a non-contact IC chip interface device to interface with the IC chip module located at the first position. Further, the encoding step may include utilizing said one of the contact IC chip interface device and non-contact IC chip interface device to interface with the IC chip module located at the first position.

In some embodiments, IC chip modules may be unlocked as supplied by a supplier of the plurality of IC chip modules, e.g. supplied without key data encoded in predetermined memory portions of the corresponding IC chips. In other embodiments, transport key data may be encoded in predetermined memory portions of the IC chips comprising the IC chip modules supplied by a supplier of the plurality of IC chip modules, wherein the IC chip modules are locked to restrict access to the transport key data (e.g. to restrict read/write access other than by use of the transport key data). In the later regard, the method may optionally include utilizing a transport key identifier to obtain the transport key data from a secure server, and unlocking the IC chip module by presenting the transport key data to the IC chip module, wherein in said encoding the issuer key data is encoded by overwriting the transport key data. By way of example, the transport key data and associated transport key identifier may be provided by a supplier of the IC chip module. In some arrangements, the unlocking may include utilizing said one of a contact IC chip interface device and a non-contact IC chip interface device to interface with the IC chip module located at said first position.

As noted, the encoding step may include writing the personalization data and the issuer key data in to different predetermined memory portions of the IC chip of the IC chip module, e.g. different predetermined ones of a plurality of data storage containers. In that regard, the IC chip module may be provided so that a first predetermined memory portion stores the key data (e.g. the transport key data and/or issuer key data) and functions as a gatekeeper for read and/or write access to other ones of the plurality of memory portions. For example, the optional utilizing step may require presentation of key data that matches or otherwise corresponds with key data encoded in the first memory portion to unlock the IC module to provide for read and/or write access to other ones of the plurality of memory portions.

In some implementations, the method may include employing an issuer key identifier to obtain the issuer key data. In that regard, the employing step may include accessing a secure server that associates the issuer key identifier with the issuer key data. By way of example, the issuer key data and associated issuer key identifier may be provided by or on behalf of the issuer payment institution.

In some embodiments, the method may include completing one of the following after the powering and before the terminating:

reading unique chip identification data assigned to and stored in a memory portion of the IC chip comprising the IC chip module; or, writing unique chip identification data assigned to and stored in a memory portion of the IC chip comprising the IC chip module.

The completing may comprise utilizing said one of a contact IC chip interface device and a non-contact IC chip interface device to interface with the IC chip module located at said first position.

In some arrangements, after said encoding and prior to said terminating, the method may include testing, or validating, the accuracy of the data encoded by the encoding and/or the accuracy of additional data stored in the IC chip memory of the IC chip module. For example, one of the contact IC chip interface device and the non-contact chip interface device may be utilized to read the encoded and/or additional stored data, wherein the testing may include comparing the read data to intended data. Such testing may be completed with the IC chip module in said first position.

As indicated, in contemplated embodiments, the IC chip module is one of a plurality of IC chip modules supportably interconnected to a flexible substrate, wherein the flexible carrier of each of the plurality of IC chip modules is defined by a different corresponding portion of a continuous length of the flexible substrate (e.g. a ribbon-like length of a flexible tape), as supplied by a supplier of the plurality of IC chip modules. In turn, the receiving, powering, utilizing, unlocking, encoding, completing, testing and terminating steps may be completed free from fixed interconnection of the IC chip module and said substrate to another structure (e.g. a card body or other structural support element).

In contemplated embodiments, the positioning step may include first advancing the flexible substrate to position the IC chip module at the first position. Further, the powering, utilizing, unlocking, encoding, completing, testing and terminating steps may be completed with the IC chip module positioned at the first position.

In some embodiments, the method may further comprise second advancing the flexible substrate to position the IC chip module at a second position. In turn, the packaging step may include separating the IC chip module from the flexible substrate at the second position, and locating the separated IC chip module in a receptacle (e.g. an antistatic bag) for provision to a third-party for inclusion in a payment object.

In conjunction with such embodiments, the method may include repeating the receiving, powering, utilizing, unlocking, encoding, completing, testing, terminating, second advancing and packaging steps for each IC chip module of the plurality of IC chip modules. Such steps may be completed free from fixed interconnection of each IC chip module and said substrate to another structure (e.g. a card body or other structural support element).

In some implementations, the receiving, powering, utilizing, unlocking, encoding, completing, testing, terminating, second advancing and packaging steps may be completed in an automated manner, e.g. by an integrated chip encoding device. Such chip encoding device may supportably house componentry for completing each of the steps in an automated manner.

In some embodiments, the flexible substrate may be wound on a reel. Further, the first and second advancing steps may include rotating in an automated manner a rotatable member engaged with at least one side edge portion of the flexible substrate in spaced relation to the plurality of IC chip modules, wherein the rotating progressively unwinds the flexible substrate from the reel. In one approach, the plurality of IC chip modules may be dual interface type IC chip modules, and the rotating may comprise positioning teeth of the rotatable member in to and out of apertures extending along the at least one side edge portion of the flexible substrate as the first rotatable member is rotated in an automated manner. In such arrangements, the plurality of dual interface type IC chip modules may be provided in either two side-by-side columns or a single column extending along a length of the flexible substrate. In some embodiments, flexible, non-supportive metal interconnections may be disposed on one side of the flexible substrate between contact pads of adjacent ones of the plurality of dual interface type IC chip modules, wherein the interconnections are severed during the separating step.

In another approach, the plurality of IC chip modules may be contactless type IC chip modules, and the rotating may comprise engaging the at least one side edge portion of the flexible substrate between a roller surface of the rotatable member and a roller surface of an opposing roller. In such arrangements, the plurality of contactless type IC chip modules may be provided in either two side-by-side columns or a single column extending along a length of the flexible substrate.

In contemplated embodiments, after completion of the packaging of the plurality of IC chip modules to fulfill a given corresponding order, the method may further comprise generating and providing a label to the corresponding receptacle for the plurality of IC chip modules, wherein the label comprises:

corresponding order identification data; and, batch identification data (e.g. where multiple production batches are required to fulfill the corresponding order).

In some arrangements, in conjunction with fulfillment of a given order, the method may further include generating and providing an issuer data return file to a corresponding issuer payment institution corresponding with the given order for IC chip modules (e.g. electronic data file). In that regard, the issuer data return file may comprise:

order identification data corresponding with the given order;

unique account identification data corresponding with each different one of a plurality of different payment accounts in relation to which corresponding account-specific personalization data, provided by the corresponding issuer payment institution, has been encoded in different ones of the IC chips of the corresponding plurality of IC chip modules utilized to fulfill the given order; and unique chip identification data for the IC chip included in each different one of the plurality of IC chip modules utilized to fulfill the given order;

wherein the unique account identification data and unique chip identification data provided in relation to each different one of the plurality of IC chip modules utilized to fulfill the given order are provided in the issue data return file in associative relation (i.e. to permit the corresponding issuer payment institution to associate each different IC chip module with a specific payment account administered by the issuer payment institution).

In turn, the corresponding issuer payment institution may utilize each pair of associated unique account identification data and unique chip identification data in conjunction with the administration of the corresponding payment account, e.g. pursuant to utilization of the corresponding IC chip module (e.g. as included in a payment object) in the completion of a given purchase transaction.

Various aspects of the method embodiment may be incorporated in a system embodiment, together with additional system features. In that regard, additional features and advantages of the present invention will become apparent upon consideration of the further description that follows.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
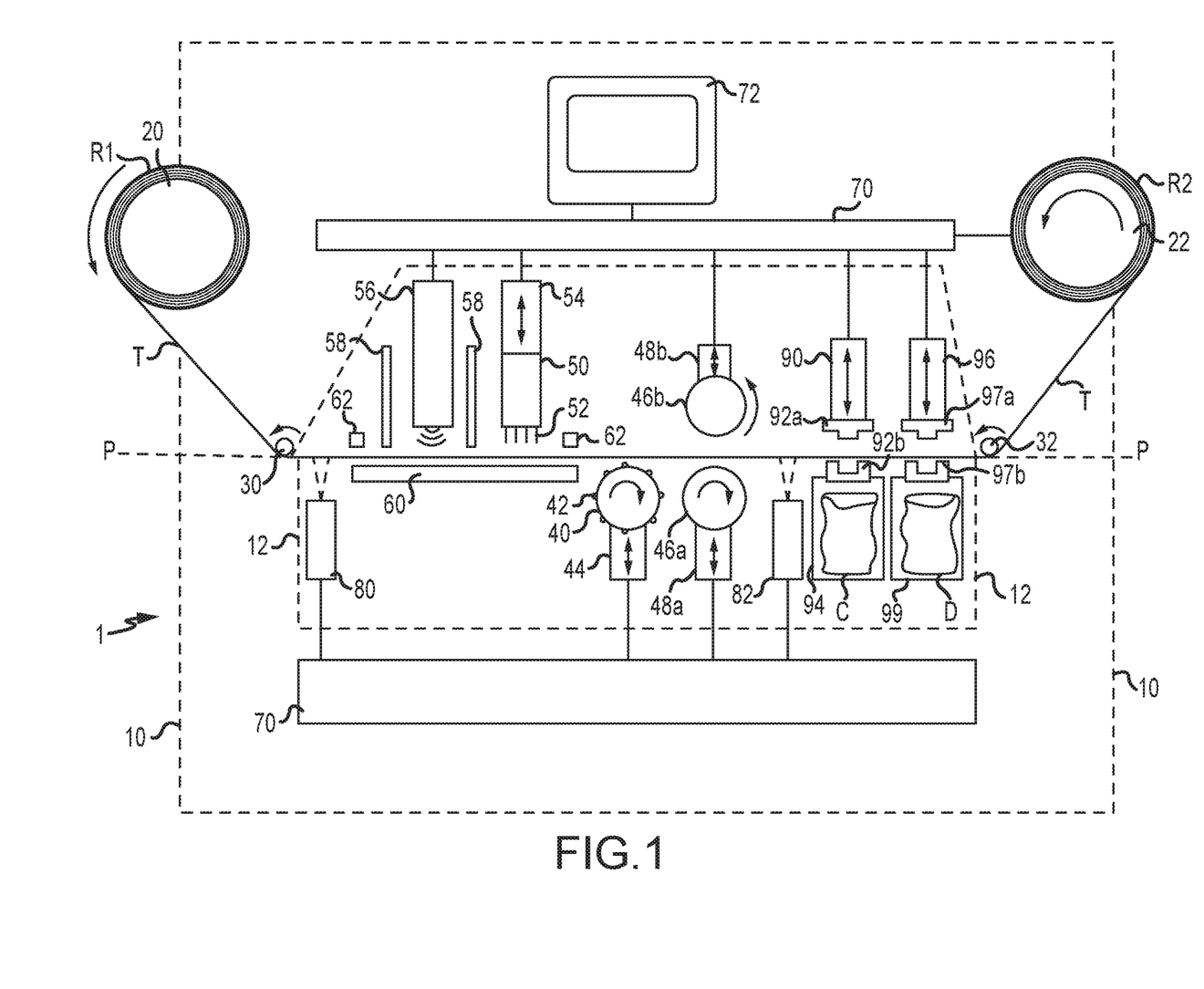
FIG. 1 illustrates one embodiment of a system for providing integrated circuit (IC) chip modules for use in payment objects.

FIG. 1 illustrates an embodiment of a system 1 for providing integrated circuit (IC) chip modules, as defined above, for use in payment objects. As illustrated, features of system 1 may be incorporated in a common housing of a chip encoding device 10 having a user accessible portion 12.

In other arrangements, the various features of system 1 may be located in separate housings.

In conjunction with the illustrated system 1, a plurality of IC chip modules may be supportably interconnected to a flexible tape T, as supplied by a third-party supplier, wherein the flexible carrier of each of the IC chip modules is defined by a different corresponding portion of the flexible tape, and wherein the flexible tape T may be wound on a first reel R1. In turn, the system 1 may include first and second reel supports 20, 22 for supporting the first reel R1 and a second reel R2, respectively. The first and second reel supports 20, 22 may be rotatable so that the flexible tape T may be progressively unwound from the first reel R1 and rewound on to the second reel R2, wherein the IC chip modules supported by the tape T may be selectively positioned at a plurality of predetermined positions along a travel path PP for various automated operations discussed below, free from fixed interconnection of the IC chip modules and flexible tape T to any other structure (e.g. a card body or other structural support element). For example, such predetermined positions may be located along a travel path PP extending between rotatable tape positioning rollers 30, 32 (e.g. a linear travel path).

The system 1 may be provided for automated positioning of the IC chip modules via engagement with at least a first side edge portion of the flexible tape T in spaced relation to the IC chip modules. In particular, system 1 may include a first rotatable member 40 for use when the IC chip modules are interconnected to a flexible tape T having apertures extending along at least the first side edge portion of the flexible tape T. The first rotatable member 40 may be automated for driven rotation (e.g. by an electric motor), and may be disposed for automated movement toward and away from, and set positioning relative to, the travel path PP and flexible tape T by an automated first positioner 44 (e.g. an electric motor or activatable solenoid). The first rotatable member 40 may comprise a plurality of outwardly projecting teeth 42 that extend about the first rotatable member 40, and that are sized, spaced and located for rotated positioning in to and out of the apertures of the flexible tape T upon rotation of the first rotatable member. In one approach, the rotatable member 40 and teeth 42 may be defined by a sprocket.

The flexible tape T may be provided to have apertures extending along each of a first side edge portion and an opposing second side edge portion of the flexible tape T. In turn, the first rotatable member 40 may comprise two sets of outwardly projecting teeth 42 that extend about the first rotatable member 40 and that are sized, spaced and located for positioning into the apertures extending along the first edge portion and second edge portion of a flexible tape T, respectively. By way of example, the flexible tape T having apertures as described above may be utilized when the IC chip modules are dual interface type IC chip modules that include an interconnected IC chip and interconnected antenna, together with contact pads interconnected to the IC chip. In such arrangements, the plurality of dual interface type IC chip modules provided in either two side-by-side columns or a single column extending along a length of the flexible tape T.

In operation, the first rotatable member 40 may be advanced from a retracted position to an advanced position by the first positioner 44, wherein in the advanced position one or more of the teeth 42 of the rotatable member 40 may be positioned within one or more of the apertures of the flexible tape T. In turn, the first rotatable member 40 may be rotated (e.g. by operation of an electric motor) to advance the flexible tape T and IC chip modules interconnected thereto to desired positions along the travel path PP on an upstream side of first rotatable member 40. In conjunction with such driven movement, the flexible tape T may be unwound from the first reel R1.

Additionally or alternatively, system 1 may include a pair of second rotatable members 46*a*, 46*b* for engaging opposing sides of at least a first side edge portion of the flexible tape T therebetween (e.g. between opposing, smooth roller surfaces of the second rotatable members 46*a*, 46*b*). The second rotatable member 46*a* may be automated for driven rotation (e.g. by an electric motor), while the second rotatable member 46*b* may be freely rotatable, and each of the second rotatable members 46*a*, 46*b*, may be disposed for automated movement toward and away from, and set positioning in advanced and retracted positions relative to, the travel path PP and flexible tape T by corresponding automated second positioners 48*a*, 48*b* (e.g. electric motors or activatable solenoids), respectively. In turn, when the second rotatable members 46*a*, 46*b* are in advanced positions (i.e. with the first side edge portion of tape T engaged therebetween) the second rotatable member 46*b* may be rotated (e.g. by operation of an electric motor) to advance the flexible tape T and IC chip modules interconnected thereto to desired positions along the travel path PP on an upstream side of second rotatable member 46*a*. In conjunction with such driven movement, the flexible tape T may be unwound from the first reel R1.

In some implementations, the second reel support 22 may be provided for automated driven rotation of the second reel R2. In that regard, the second reel support 22 may be rotated so as to selectively rewind the flexible tape T on the second reel R2. Further, the second reel support may also be rotated to advance the flexible tape T and IC chip modules interconnected thereto to desired positions along the travel path PP on a downstream side of the first rotatable member 40.

System 1 may further include at least one contact IC chip interface device 50 and/or at least one non-contact IC chip interface device 56 to interface with the IC chip modules for encoding-related operations, including powering, encoding data (e.g. writing data to), reading data from, and testing data encoded or otherwise stored in different predetermined memory portions of the memory of the IC chips of the IC chip modules, as described herein. The encoding-related operations may be completed in an encoding region in which the flexible tape T is positioned in a track defined by a base member 60 (e.g. a teflon member defining a recessed track) and one or more opposing clamp, or positioning, member(s) 62.

As described herein, encoding-related operations may include encoding data in different predetermined memory portions of the IC chips comprising the IC chip modules, including at least the following data:
personalization data provided by an issuer payment institution corresponding with a specific payment account administered by the payment institution, including corresponding account identification data; and,
issuer key data provided by the issuer payment institution.
Further, such encoding-related operations may include reading unique chip identification data assigned to and stored in a memory portion of the IC chips of the IC chip modules. Alternatively and/or additionally, encoding-related operations may include writing unique chip identification data assigned to and stored in a memory portion of the IC chips of the IC chip modules. In contemplated embodiments, encoding-related operations may be completed in an automated manner under the control of one or more controller(s) 70 comprising the system 1, wherein for each of the IC modules the controller 70 stores corresponding data in associative relation, including order identification data, unique account identification data and unique chip identification data, as described herein.

The contact IC chip interface device 50 may include a plurality of contact pins 52 located to contact different ones of the contact pads of IC chip modules of the dual interface type for data transmission therebetween. The contact IC chip interface device 50 may further include an automated positioner 54 (e.g. an electric motor or activatable solenoid) for automated movement toward and away from, and set positioning relative to, the travel path PP and IC chip modules.

To accommodate automated processing of IC chip modules provided in two side-by-side columns extending along a length of the flexible tape T, the contact IC chip interface device 50 may be provided for automated side-to-side positioning between first and second positions to sequentially complete encoding-related operation in relation to both columns of IC chip modules. Alternatively, a pair of side-by-side contact IC chip interface devices 50 may be provided for automated encoding-related operations in relation to different, corresponding columns of the IC chip modules.

The non-contact interface device 56 may include an RF signal transceiver for noncontact interface with the antennas of the IC chip modules for data transmission. The system 1 may further comprise RF signal shielding members 58 disposed adjacent to upstream and downstream sides of the non-contact IC chip interface device 56 to shield adjacent ones of the IC chip modules interconnected to the flexible tape T from cross-talk and/or from RF signal transmissions between the non-contact IC chip interface device 56 and a given, intended one of the IC chip modules. For example, metal-containing shielding members 58 may be disposed around the sides of the region within which the non-contact IC chip interface device 56 completes encoding-related operations.

To accommodate automated processing of IC chip modules provided in two side-by-side columns extending along a length of the flexible tape T, the non-contact IC chip interface device 56 and RF signal shielding members 58 may be provided for automated side-to-side positioning between first and second positions to sequentially complete encoding-related operation in relation to both columns of IC chip modules. Alternatively, a pair of side-by-side non-contact IC chip interface devices 56 and corresponding shielding members 58 may be provided for automated encoding-related operations in relation to different, corresponding columns of the IC chip modules.

As indicated, system 1 may further include one or more controller(s) 70. Each controller 70 comprises one or more computer processor(s) interconnected to one or more software module(s) and/or associated database(s) stored in one or more computer-readable medium, wherein the software module(s) comprise preprogrammed instructions that are executable to configure the processor(s) to provide control signals for positioning the IC chip modules supportably interconnected to flexible tape T at desired positions along the travel path PP for IC chip module encoding-related operations, and for additional operations discussed herein. As shown, system 1 may further include a user interface 72, interconnected to controller 70 for receiving user input (e.g. via a touch screen, keyboard, mouse, etc.) and/or for providing user output (e.g. via a display, touch screen, etc.).

In particular, position control signals may be provided to control operation and/or positioning of a predetermined component set comprising either the first rotatable member 40 and first positioner 44, or comprising the second rotatable members 46a, 46b and second positioners 48a, 48b, and to control operation of second reel support 22, so as to position the IC chip modules supportably interconnected to the flexible tape T at corresponding desired positions along the travel path PP. The predetermined component set may be established by controller 70 in relation to a given order for IC chip modules utilizing corresponding order data stored in one or more database(s), and/or established by controller 70 utilizing user input at user interface 72.

In conjunction with the provision of positioning control signals, controller 70 may utilize position signals provided by one or more position sensors 80, 82. The position sensors 80, 82 may provide position signals that are indicative of the presence of a given IC chip module within a corresponding position sensing field (e.g. an imaging field of an optical sensor). In the illustrated embodiment, a first position sensor 80 may be positioned upstream of the contact IC chip interface device 50 and non-contact IC chip interface device 56. Further, a second position sensor 82 may be located downstream of the first rotatable member 40 and the pair of second rotatable members 46a, 46b.

As indicated, the controller(s) 70 may further provide control signals for IC chip module encoding-related operations. In that regard, control signals may be provided to a predetermined one of the contact IC chip interface device(s) 50 or non-contact IC chip interface device(s) 56 for data transmission communications with IC chip modules to permit controller(s) 70 to encode data to and read data from different predetermined memory portions of the IC chips. The predetermined one of the contact IC chip interface device(s) 50 or non-contact IC chip interface device(s) 56 may be established by controller(s) 70 in relation to a given order for IC chip modules utilizing corresponding order data stored in one or more of the database(s), and/or established by controller(s) 70 utilizing user input at user interface 72. Further, data read from and/or written to the IC chips of the IC chip modules during encoding-related operations for a given order of IC chip modules may be stored in the database(s) of controller(s) 70.

In conjunction with encoding-related operations, the controller(s) 70 may further provide control signals to a predetermined one of the contact IC chip interface device(s) 50 and non-contact IC chip interface device(s) 56 for data transmission communications with IC chip modules to permit controller(s) 70 to test data stored within and operational capabilities of the IC chip modules in relation to corresponding test parameters (e.g. utilizing data stored in the database(s)). In turn, the controller 70 may be provided so that, in the event a given IC chip module passes such testing such acceptable IC chip module may be automatically advanced to a predetermined position within system 1 for packaging with other acceptable IC chip modules to be provided in fulfillment of a given order, and in the event a given IC chip module does not pass such testing such non-acceptable IC chip module may be automatically advanced to at least one other predetermined position at which a hole is punched through the corresponding antenna of the unacceptable IC chip module and/or at which the unacceptable IC chip module is separated from the flexible tape T for disposal.

More particularly, and as shown in FIG. 1, system 1 may include a first punch 90 for use with a first replaceable die set comprising first and second die members 92a, 92b disposed on opposing sides of the travel path PP and employable to separate (i.e. punch out) acceptable IC chip modules from the flexible tape T when the acceptable chip modules are successively positioned therebetween. The first punch 90 may be automated (e.g. by an electric motor) for advancement and the retraction of die member 92a relative to die member 92b (e.g. pursuant to control signals provided by the controller(s) 70), wherein at least a portion of the die member 92a extends across the travel path PP and through flexible tape T during advancement. System 1 may further include a first receptacle support 94 for supporting a receptacle C (e.g. an antistatic receptacle) in a position below die member 92b for receipt of acceptable IC chip modules separated from the flexible tape T. By way of example, the receptacle C may be utilized to receive acceptable IC chip modules for subsequent provision to a third-party payment object provider in fulfillment of a corresponding order.

To accommodate automated processing of IC chip modules provided in two side-by-side columns extending along a length of the flexible tape T, the first punch 90 may be provided for automated side-to-side positioning between first and second positions to sequentially complete encoding-related operation in relation to both columns of IC chip modules. Alternatively, a pair of side-by-side first punches 90 and corresponding first receptacle support 94 may be provided for automated IC chip module separation operations in relation to different, corresponding columns of the IC chip modules.

As further shown in FIG. 1, system 1 may include a second punch 96 for use with a second replaceable die set comprising first and second die members 97a, 97b disposed on opposing sides of the travel path PP and employable to separate (i.e. punch out) non-acceptable IC chip modules from the flexible tape T when the non-acceptable chip modules are successively positioned therebetween. The second punch 96 may be automated (e.g. by an electric motor) for advancement and the retraction of die member 97a relative to die member 97b (e.g. pursuant to control signals provided by the controller(s) 70), wherein at least a portion of the die member 97a extends across the travel path PP and through flexible tape T during advancement. System 1 may further include a second receptacle support 99 for supporting a receptacle D in a position below die member 97b for receipt of non-acceptable IC chip modules separated from the flexible tape T. By way of example, the receptacle D may be utilized to receive non-acceptable IC chip modules for subsequent disposal.

To accommodate automated processing of IC chip modules provided in two side-by-side columns extending along a length of the flexible tape T, the second punch 96 may be provided for automated side-to-side positioning between first and second positions to sequentially complete encoding-related operation in relation to both columns of IC chip modules. Alternatively, a pair of side-by-side second punches 96 and corresponding receptacle supports 99 may be provided for automated IC chip separation operations in relation to different, corresponding columns of the IC chip modules.

As indicated, order-related data may be stored in one or more database(s) of controller(s) 70 that pertains to each given order for a plurality of IC chip modules to be supplied to a corresponding third-party for inclusion in payment objects. For each given order the order related data may include the following types of data:

order identification data corresponding with the given order;
account-specific personalization data, provided by an issuer payment institution, corresponding with a plurality of different payment accounts to be administered by the issuer payment institution (e.g. prepayment accounts and/or payment accounts registered and tied to existing financial transaction accounts (e.g. a credit or debit account)), for encoding in different ones of a plurality of IC chip modules utilized to fulfill the given order;

issuer key data provided by the referenced issuer payment institution, corresponding with the plurality of different payment accounts to be administered by the issuer payment institution, for encoding in the plurality of IC chip modules utilized to fulfill the given order;

issuer payment institution identification data for the referenced payment institution;

unique account identification data corresponding with each different one of said plurality of different accounts; and/or, unique chip identification data for the IC chip included in each different one of the plurality of IC chip modules utilized to fulfill the given order As may be appreciated, the account-specific personalization data and issuer key data may be stored in a database(s) at a secure server, and may only be accessible by use of access data provided by the issuer payment institution (e.g. an issuer key identifier).

A portion of the order-related data referenced above may be included in an issuer data return file that may be provided to the issuer payment institution corresponding with a given order for IC chip modules to be included in payment objects associated with the order. The issuer data return file may be provided to the issuer payment institution in conjunction with fulfillment of the corresponding order for IC chip modules (e.g. in conjunction with delivery of the IC chip modules to a corresponding third-party for inclusion in payment objects.)

The issuer data return file may comprise:

order identification data corresponding with a given order; and, unique account identification data corresponding with each different one of a plurality of different payment accounts in relation to which corresponding account-specific personalization data, provided by the corresponding issuer payment institution, has been encoded in different ones of the IC chips of the corresponding plurality of IC chip modules utilized to fulfill the given order; and unique chip identification data for the IC chip included in each different one of the plurality of IC chip modules utilized to fulfill the given order;

wherein the unique account identification data and unique chip identification data provided in relation to each different one of the plurality of IC chip modules utilized to fulfill the given order are provided in the issue data return file in associative relation (i.e. to permit the corresponding issuer payment institution to associate each different IC chip module with a specific payment account administered by the issuer payment institution).

In turn, the corresponding issuer payment institution may utilize each pair of associated unique account identification data and unique chip identification data in conjunction with the administration of the corresponding payment account, e.g. pursuant to utilization of the corresponding IC chip module (e.g. as included in a payment object) in the completion of a given purchase transaction.

Figure 2A:
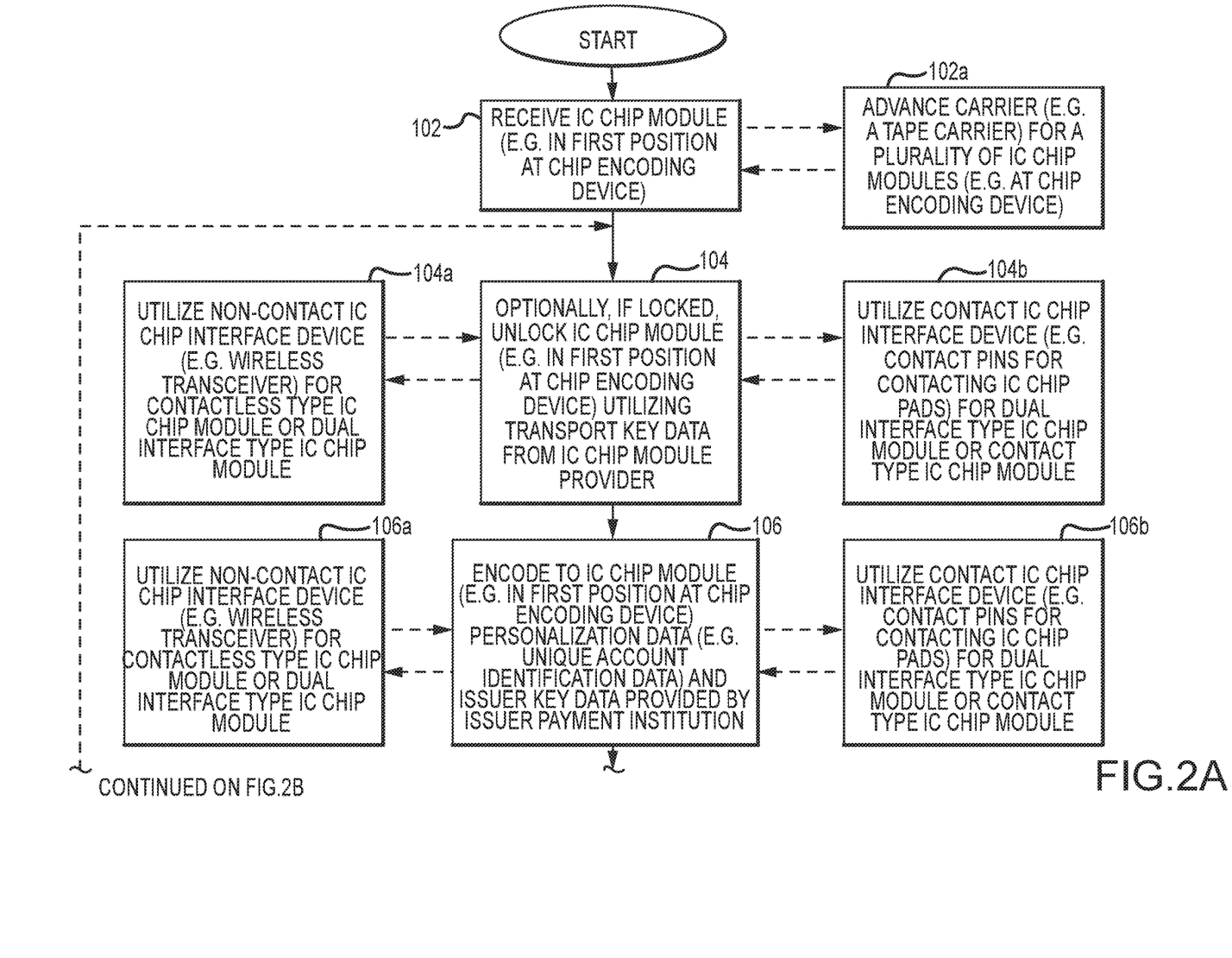
FIGS. 2A and 2B illustrate one embodiment of a method for providing integrated circuit (IC) chip modules for use in payment objects.
Figure 2B:
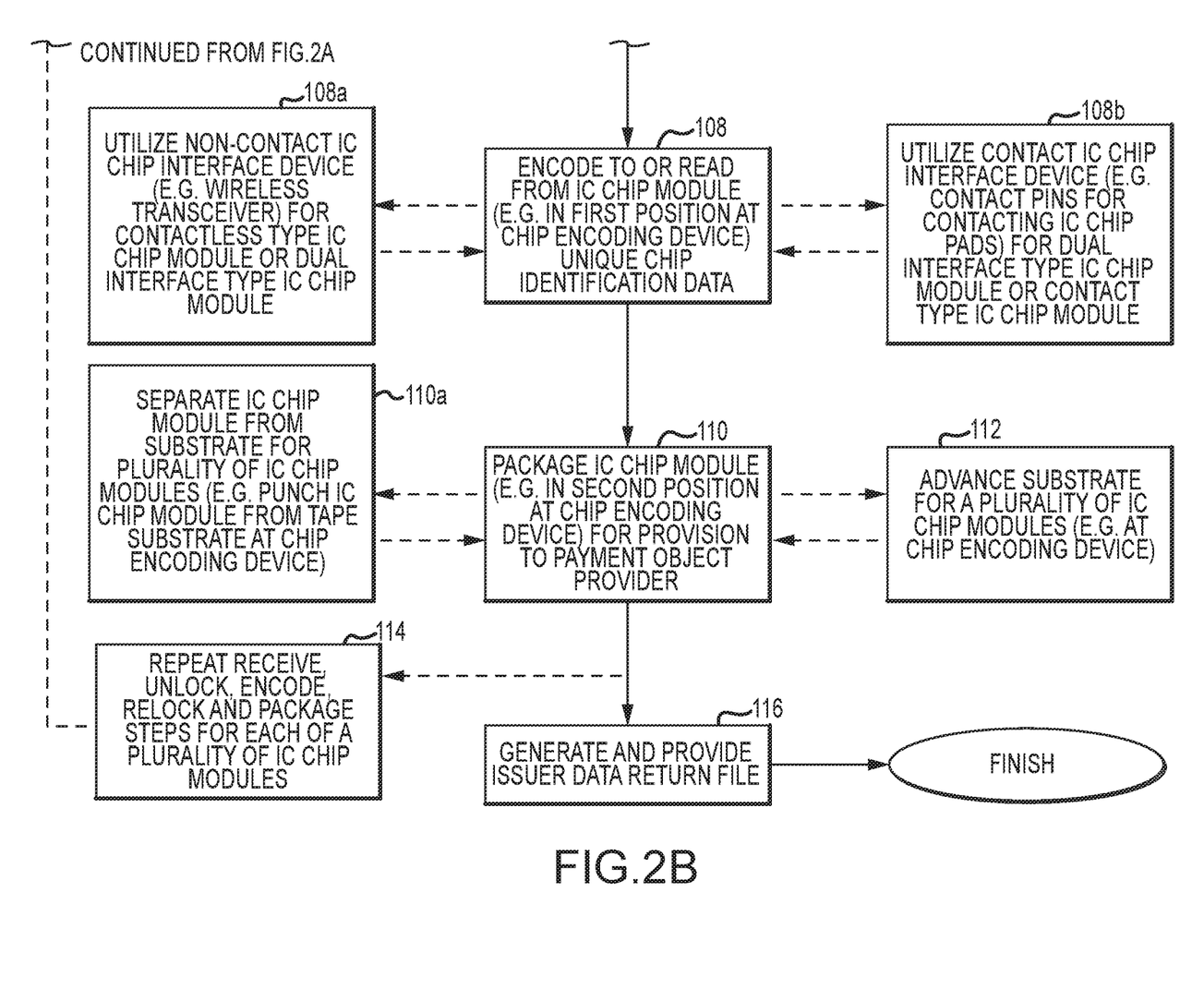

Reference is now made to FIG. 2 which illustrates one embodiment of a method 100 for providing IC chip modules for use in payment objects. As may be appreciated, in some implementations, various aspects of the system 1 as described above may be employed in conjunction with the method 100.

Method 100 may include receiving an IC chip module, step 102, wherein the IC chip module is either unlocked, or locked with transport key data encoded in the IC chip module as received. In the later regard, the IC chip module may be supplied by a supplier of IC chip modules who has encoded the transport key data in to the IC chip module. In one approach, the receiving step 102 may include positioning the IC chip module in a first position at a chip encoding device.

Optionally, in arrangements in which the IC chip module is locked when received, the method 100 may further include unlocking the IC chip module (e.g. in the first position at chip encoding device) utilizing transport key data, step 104, wherein the transport key data may be separately provided by the IC chip module supplier. The unlocking step 104 may include utilizing a non-contact IC chip interface device (e.g. a wireless RF transceiver), step 104a. Alternatively, the unlocking step 102 may include utilizing a contact IC chip interface device (e.g. a device including contact pins for contacting IC chip pads), step 104b. As may be appreciated, the non-contact IC chip interface device may be utilized for unlocking both contactless type IC chip modules and dual interface type IC chip modules, and the contact IC chip interface device may be utilized for unlocking dual interface type IC chip modules and contact type IC chip modules. In either case, the non-contact or contact IC chip interface device may provide power to the IC chip module.

The method 100 may further include encoding the unlocked IC chip module (e.g. in the first position at chip encoding device) with personalization data provided by an issuer payment institution and corresponding with a specific payment account administered by the payment institution (e.g. unique account identification data) and with issuer key data provided by the issuer payment institution, step 106. In arrangements in which the IC chip module is locked when received, encoding may be completed by overwriting the transport key data with the issuer key data. The encoding step 106 may include utilizing a non-contact IC chip interface device (e.g. a wireless RF transceiver), step 106a. Alternatively, the encoding step 106 may include utilizing a contact IC chip interface device (e.g. a device including contact pins for contacting IC chip pads), step 106b. As may be appreciated, the non-contact IC chip interface device may be utilized for encoding both contactless type IC chip modules and dual interface type IC chip modules, and the contact IC chip interface device may be utilized for encoding dual interface type IC chip modules and contact type IC chip modules. In either case, the non-contact or contact IC chip interface device may provide power to the IC chip module.

Additional encoding-related operations may be completed via interface between the IC chip module and a non-contact IC chip interface device and/or a contact IC chip interface device. In particular, additional operations may include reading unique chip identification data from a memory portion (e.g. an ROM portion) of the IC chip of the IC chip module and/or encoding unique chip identification data to a memory portion of the IC chip of the IC chip module, step 108. The unique chip identification data may also be stored in one or more database(s) in associative relation to the corresponding unique account identification data, as described herein. Further, additional encoding-related operations may include testing, or validating, data stored in one or more memory portions of the IC chip module by reading such data and comparing such data with stored intended data. After step 108, and any additional encoding-related operations, the provision of power by the non-contact IC chip interface device or contact chip interface device may be terminated, thereby locking the IC chip module.

The method 100 may further include packaging the IC chip module for provision to a payment object provider, step 110. In that regard, the IC chip module may be positioned in a second position for the packaging step 110.

In contemplated embodiments, the IC chip module may be one of a plurality of IC chip modules supportably interconnected to a flexible substrate (e.g. a flexible tape), as supplied by the supplier of the IC chip module as described hereinabove. In turn, the receiving step 102 may include advancing the flexible substrate in an automated manner so as to position the IC chip module at the first position, step 102a. Further, in conjunction with the packaging step 110, the method embodiment 100 may include advancing the flexible substrate in an automated manner to position the IC chip module at the second position, step 112.

In conjunction with the packaging step 110, the method 100 may further include separating the IC chip module from the flexible substrate, step 110a. By way of example, such separation may be achieved by punching the IC chip module from the flexible substrate. In turn, the separated IC chip module may be located in a receptacle for provision to a third-party payment object provider in fulfillment of a corresponding order.

As may be appreciated, the receiving step 102, optional unlocking step 104, encoding step 106, encoding/reading step 108, packaging step 110 and additional steps described above may be repeated for each of a plurality of IC chip modules to be provided to a payment object provider in fulfillment of a given order, step 114. In that regard, each of the referenced steps may be completed for each of the IC chip modules free from fixed interconnection of the IC chip modules and said flexible substrate to another structure (e.g. a card body or other structural element). Finally, in conjunction with order fulfillment, an issuer data return file may be generated and provided as described above, step 116.

Various embodiments may comprise any number of combinations of method and/or system features described above and/or hereinbelow. Such combinations may include those encompassed by the following Embodiments 1. A method for providing integrated circuit (IC) chip modules for use in payment objects, comprising:
receiving an integrated circuit (IC) chip module, wherein said IC chip module is one of a plurality of IC chip modules supportably interconnected to a flexible substrate, and wherein each of the plurality of IC chip modules comprise an IC chip and interconnected antenna that are fixedly interconnected to a flexible carrier defined by different portions of said flexible substrate;
powering the IC chip module;
encoding the following data in the IC chip comprising the IC chip module after the powering:
personalization data provided by an issuer payment institution corresponding with a specific account administered by the issuer payment institution; and,
issuer key data provided by the issuer payment institution;
terminating the powering after the encoding, wherein the IC chip module is automatically locked to restrict access to at least the issuer key data; and,
packaging the IC chip module, after the terminating, for provision to a third-party payment object provider;
wherein said receiving, powering, encoding and terminating are completed with said IC chip module supportably interconnected to the flexible substrate, free from fixed interconnection of said IC chip module and said flexible substrate to another support structure.

2. A method as recited in Embodiment 1, wherein said receiving comprises:
positioning the IC chip module at a first position.

3. A method as recited in Embodiment 1 or Embodiment 2, wherein said powering comprises:
utilizing one of a contact IC chip interface device and a non-contact IC chip interface device to interface with the IC chip module located at the first position.

4. A method as recited in any one of Embodiments 1-3, wherein said encoding comprises:
utilizing said one of a contact IC chip interface device and non-contact IC chip interface device to interface with the IC chip module located at said first position.

5. A method as recited in any one of Embodiments 1-4, wherein transport key data is encoded in the received IC chip module, and further comprising:
utilizing a transport key identifier to obtain the transport key data from a secure server;
unlocking the IC chip module by presenting the transport key data to the IC chip module and, wherein said encoding the issuer key data is encoded by overwriting the transport key data.

6. A method as recited in any one of Embodiments 1-5, wherein said unlocking comprises:
utilizing said one of a contact IC chip interface device and a non-contact IC chip interface device to interface with the IC chip module located at said first position.

7. A method as recited in any one of Embodiments 1-6, further comprising:
employing an issuer key identifier to obtain the issuer key data from said secure server.

8. A method as recited in any one of Embodiments 1-7, wherein the encoding comprises:
writing said personalization data and said issuer key data in to different predetermined memory portions of the IC chip comprising the IC chip module.

9. A method as recited in any one of Embodiments 1-8, further comprising:
completing one of the following after the powering and before the terminating:
reading unique chip identification data assigned to and stored in a memory portion of the IC chip comprising the IC chip module; or,
writing unique chip identification data assigned to and stored in a memory portion of the IC chip comprising the IC chip module.

10. A method as recited in any one of Embodiments 1-9, wherein said completing comprises:
utilizing said one of a contact IC chip interface device and a non-contact IC chip interface device to interface with the IC chip module located at said first position.

11. A method as recited in any one of Embodiments 1-10, wherein said positioning comprises:
first advancing said flexible substrate to position the IC chip module at said first position.

12. A method as recited in any one of Embodiments 1-11, wherein said receiving, powering, encoding completing, and terminating are completed in an automated manner.

13. A method as recited in any one of Embodiments 1-12, wherein said powering, unlocking, encoding, completing, and terminating are completed with said IC chip module positioned at said first position.

14. A method as recited in any one of Embodiments 1-13, further comprising:
second advancing said flexible substrate to position the IC chip module at a second position for the packaging.

15. A method as recited in any one of Embodiments 1-14, wherein said packaging comprises:
separating the IC chip module from said carrier at said second position; and,
locating the IC chip module, after the separating, in a receptacle for provision to the third-party payment object provider.

16. A method as recited in any one of Embodiments 1-15, wherein said receiving, powering, encoding, completing, terminating, second advancing, and packaging are completed in an automated manner.

17. A method as recited in any one of Embodiments 1-16, further comprising:
repeating said receiving, powering, encoding, completing, terminating, second advancing and packaging for each of said plurality of IC chip modules for provision to the third-party payment object provider in relation to fulfillment of a given order, wherein the personalization data and issuer data for each of the plurality of IC chip modules is provided by the same issuer payment institution.

18. A method as recited in any one of Embodiments 1-17, further comprising:
providing an issuer data return file to said issuer payment institution in relation the given order comprising said plurality of IC chip modules, wherein the issuer data return file comprises:
order identification data corresponding with the given order; and,
the unique account identification data corresponding with each different one of a plurality of different payment accounts in relation to which corresponding account-specific personalization data, provided by the issuer payment institution, has been encoded in different ones of the IC chips of the corresponding plurality of IC chip modules utilized to fulfill the given order; and
the unique chip identification data for the IC chip included in each different one of the plurality of IC chip modules utilized to fulfill the given order;
wherein the unique account identification data and unique chip identification data provided in relation to each different one of the plurality of IC chip modules utilized to fulfill the given order are provided in the issuer data return file in associative relation.

19. A method as recited in any one of Embodiments 1-18, wherein said flexible substrate comprises a flexible tape that is wound on a reel, and wherein said first and second advancing comprise:
rotating in an automated manner, a rotatable member engaged with at least one edge portion of said flexible tape in spaced relation to said plurality of IC chip modules, wherein said rotating progressively unwinds said flexible tape from said reel.

20. A method as recited in any one of Embodiments 1-19, wherein when said plurality of IC chip modules are dual interface type IC chip modules, said rotating comprises:
positioning teeth of said rotatable member into and out of apertures extending along said at least one edge portion of said flexible tape as said first rotatable member is rotated in an automated matter.

21. A method as recited in any one of Embodiments 1-20, wherein when said plurality of IC chip modules are contactless type IC chip modules, and wherein said rotating comprises:
engaging said at least one edge portion of said flexible tape between a roller surface of said rotatable member and a roller surface of an opposing roller.

22. A system for providing integrated circuit (IC) chip modules for use in payment objects, comprising:
at least a first rotatable member for engaging a first side edge portion of a flexible substrate to which a plurality of IC chip modules are supportably interconnected;
at least one controller to provide position control signals for automated rotation of the first rotatable member and automated positioning of each of the plurality of IC chip modules at one or more of a plurality of predetermined positions along a travel path, free from fixed interconnection of the plurality of IC modules and interconnected flexible substrate to any other structure; at least one of a contact IC chip interface device and non-contact IC chip interface device for encoding data in predetermined memory portions of IC chips comprising the plurality of IC modules at said one of the plurality of predetermined positions, including personalization data provided by an issuer payment institution corresponding with a specific payment account administered by the issuer payment institution and issuer key data provided by the issuer payment institution, wherein said at least one controller provides encoding control signals to said at least one of a contact IC chip interface device and non-contact IC chip interface device for said data encoding.

23. A system as recited in Embodiment 22, further comprising:
at least a first punch for separating acceptable ones of said plurality of IC chip modules from the flexible tape at another one of said plurality of predetermined positions in response to control signals provided by said at least one controller.

24. A system as recited in Embodiment 22 or Embodiment 23, further comprising:
at least a first receptacle support for supporting a receptacle, wherein for a given order of IC chip modules a plurality of said separated, acceptable ones of said plurality of IC chip modules are receivable in a common receptacle supported by the first receptacle support.

25. A system as recited in any one of Embodiments 22-24, further comprising:
a second punch for separating unacceptable ones of said plurality of IC chip modules from the flexible tape at an additional one of said plurality of predetermined positions in response to control signals provided by said at least one controller.

26. A system as recited in any one of Embodiments 22-25, wherein said at least one of an contact IC chip interface device and non-contact IC chip interface device is further provided for testing IC chips of the plurality of IC chip modules, pursuant to control signals provided by the at least one controller, to identify unacceptable ones and said acceptable ones of said plurality of IC chip modules.

27. A system as recited in any one of Embodiments 22-26, wherein said at least one of a contact IC chip interface device and non-contact IC chip interface device comprises:
a radio frequency signal transceiver for non-contact interface with antennas of the plurality of IC chip modules for data transmission; and,
radio frequency shielding members disposed adjacent to upstream and downstream sides of the non-contact IC chip interface device to shield adjacent ones comprising the plurality of IC chip modules during said data encoding.

28. A system as recited in any one of Embodiments 22-27, further comprising:
one or more position sensor for providing position signals indicative of the presence of a given IC chip module of said plurality of IC chip modules within a corresponding position sensing field, wherein said at least one controller utilizes said position signals in providing said position control signals.

29. A system as recited in any one of Embodiments 22-28, wherein said at least one position sensor comprises:
a first position sensor positioned upstream of said at least one contact IC chip interface device and non-contact IC chip interface device.

30. A system as recited in any one of Embodiments 22-29, wherein said at least one position or more position sensor further comprises:
a second position sensor located downstream of the first rotatable member.

31. A system as recited in any one of Embodiments 22-30, wherein said first rotatable member comprises:
a plurality of outwardly projecting teeth that extend about the first rotatable member for rotated positioning in to and out of apertures extending along at least said first side edge portion of said flexible substrate.

32. A system as recited in any one of Embodiments 22-31, wherein said plurality of IC chip modules are dual interface type chip modules that include an IC chip, an antenna and contact pads interconnected thereto, wherein said first rotatable member comprises:
two sets of outwardly projecting teeth that extend about the first rotatable member for rotated positioning in to and out of apertures extending along said first side edge portion and a second side edge portion of said flexible substrate.

33. A system as recited in any one of Embodiments 22-32, further comprising:
a second rotatable member, wherein said first and second rotatable members are disposed for engaging opposing sides of at least said first side edge portion of the flexible substrate.

34. A system as recited in any one of Embodiments 22-33, wherein flexible substrate and supportably interconnected plurality of IC chip modules are provided on a first reel, and wherein said system further comprises:
a first rotatable reel support for supporting said first reel upstream of said plurality of predetermined positions; and,
a rotatable second reel support for supporting a second reel downstream of said plurality of predetermined positions, wherein said flexible substrate and may be progressively unwound from the first reel and rewound on the second reel.

35. A system as recited in any one of Embodiments 22-34, wherein said second reel is provided for automated driven rotation, in response to control signals provided by said at least one controller, to position said plurality of IC chip modules at one or more of said plurality of predetermined positions, downstream of said first rotatable member.

36. A system as recited in any one of Embodiments 22-35, wherein said at least one of an contact IC chip interface device and non-contact IC chip interface device is further provided for powering, reading data from, and testing data stored in predetermined memory portions of the memory of the IC chips of the plurality of IC chip modules pursuant to control signals provided by the at least one controller.

37. A system as recited in any one of Embodiments 22-36, wherein for each of said plurality of IC chip modules the at least one controller stores corresponding order identification data, unique account identification data and unique chip identification data.

38. A system as recited in any one of Embodiments 22-37, wherein said system includes a contact IC chip interface device and a non-contact IC chip interface device for encoding data, and wherein said encoding control signals are provided to a predetermined one of said contact IC chip interface device and said non-contact IC chip interface device for encoding data in relation to a given order for IC chip modules utilizing corresponding stored order data.

39. A system as recited in any one of Embodiments 22-38, further comprising:
an encoding region for completing said data encoding with said flexible substrate positioned in a track defined by a base member and an opposing positioning member.

40. A system as recited in any one of Embodiments 22-39, for use in completing the method of any one of Embodiments 1-21.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only preferred embodiment and variants thereof have been shown and described and that all changes and modifications that come within the spirit of the invention are desired to be protected.

What is claimed is:

1. A system for providing integrated circuit (IC) chip modules for use in payment objects, comprising:
a plurality of IC chip modules supportably interconnected to a first reel of flexible tape, each of the plurality of IC chip modules comprising an IC chip and interconnected antenna that are fixedly interconnected to a flexible carrier defined by different portions of said flexible tape;
at least a first rotatable member engaging a first side edge portion of the flexible tape;
at least one controller to provide position control signals for automated rotation of the first rotatable member and automated positioning of each of the plurality of IC chip modules at one or more of a plurality of predetermined positions along a travel path, free from fixed interconnection of the plurality of IC modules and the flexible tape to any card body or other support structure;
at least one of a contact IC chip interface device and a non-contact IC chip interface device for encoding data in predetermined memory portions of each of the IC chips of the plurality of IC modules at said one of the plurality of predetermined positions, the data including personalization data provided by an issuer payment institution corresponding with a specific payment account administered by the issuer payment institution and issuer key data provided by the issuer payment institution, wherein said at least one controller provides encoding control signals to said at least one of a contact IC chip interface device and non-contact IC chip interface device for said data encoding.

2. A system as recited in claim 1, further comprising:
at least a first punch for separating acceptable ones of said plurality of IC chip modules from the flexible tape at another one of said plurality of predetermined positions in response to control signals provided by said at least one controller.

3. A system as recited in claim 2, further comprising:
at least a first receptacle support for supporting a receptacle, wherein for a given order of IC chip modules a plurality of said separated, acceptable ones of said plurality of IC chip modules are receivable in a common receptacle supported by the first receptacle support.

4. A system as recited in claim 2, further comprising:
a second punch for separating unacceptable ones of said plurality of IC chip modules from the flexible tape at an additional one of said plurality of predetermined positions in response to control signals provided by said at least one controller.

5. A system as recited in claim 2, wherein said at least one of an contact IC chip interface device and non-contact IC chip interface device is further provided for testing IC chips of the plurality of IC chip modules, pursuant to control signals provided by the at least one controller, to identify unacceptable ones and said acceptable ones of said plurality of IC chip modules.

6. A system as recited in claim 1, wherein said at least one of a contact IC chip interface device and non-contact IC chip interface device comprises:
a radio frequency signal transceiver for non-contact interface with antennas of the plurality of IC chip modules for data transmission; and,
radio frequency shielding members disposed adjacent to opposing sides of the non-contact IC chip interface device to shield adjacent ones comprising the plurality of IC chip modules during said data encoding.

7. A system as recited in claim 1, further comprising:
one or more position sensor for providing position signals indicative of the presence of a given IC chip module of said plurality of IC chip modules within a corresponding position sensing field, wherein said at least one controller utilizes said position signals in providing said position control signals.

8. A system as recited in claim 7, wherein said at least one position sensor comprises:
a first position sensor positioned upstream of said at least one contact IC chip interface device and non-contact IC chip interface device.

9. A system as recited in claim 8, wherein said at least one position or more position sensor further comprises:
a second position sensor located downstream of the first rotatable member.

10. A system as recited in claim 1, wherein said first rotatable member comprises:
a plurality of outwardly projecting teeth that extend about the first rotatable member for rotated positioning in to and out of apertures extending along at least said first side edge portion of said flexible tape.

11. A system as recited in claim 1, further comprising:
a second rotatable member, wherein said first and second rotatable members are disposed for engaging opposing sides of at least said first side edge portion of the flexible tape.

12. A system as recited in claim 1, wherein flexible substrate and supportably interconnected plurality of IC chip modules are provided on a first reel, and wherein said system further comprises:
a first rotatable reel support for supporting said first reel upstream of said plurality of predetermined positions; and,
a rotatable second reel support for supporting a second reel downstream of said plurality of predetermined positions, wherein said flexible tape and may be progressively unwound from the first reel and rewound on the second reel.

13. A system as recited in claim 1, wherein said second reel is provided for automated driven rotation, in response to control signals provided by said at least one controller, to position said plurality of IC chip modules at one or more of said plurality of predetermined positions, downstream of said first rotatable member.

14. A system as recited in claim 1, wherein said at least one of an contact IC chip interface device and non-contact IC chip interface device is further provided for powering, reading data from, and testing data stored in predetermined memory portions of the memory of the IC chips of the plurality of IC chip modules pursuant to control signals provided by the at least one controller.

15. A system as recited in claim 1, wherein for each of said plurality of IC chip modules the at least one controller stores corresponding order identification data, unique account identification data and unique chip identification data.

16. A system as recited in claim 1, wherein said system includes a contact IC chip interface device and a non-contact IC chip interface device for encoding data, and wherein said encoding control signals are provided to a predetermined one of said contact IC chip interface device and said non-contact IC chip interface device for encoding data in relation to a given order for IC chip modules utilizing corresponding stored order data.

17. A system as recited in claim 1, further comprising:
an encoding region for completing said data encoding with said flexible tape positioned in a track defined by a base member and an opposing positioning member.

* * * * *